United States Patent
Vollmer et al.

(10) Patent No.: US 11,919,782 B2
(45) Date of Patent: Mar. 5, 2024

(54) METHOD FOR MANGANESE OXIDES DISSOLUTION

(71) Applicants: Daniel P. Vollmer, Lafayette, LA (US); Dorianne A. Castillo, Humble, TX (US)

(72) Inventors: Daniel P. Vollmer, Lafayette, LA (US); Dorianne A. Castillo, Humble, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/678,539

(22) Filed: Feb. 23, 2022

(65) Prior Publication Data
US 2023/0264973 A1    Aug. 24, 2023

(51) Int. Cl.
*C09K 8/58* (2006.01)
*C01G 45/02* (2006.01)
*C09K 8/03* (2006.01)

(52) U.S. Cl.
CPC .............. *C01G 45/02* (2013.01); *C09K 8/032* (2013.01); *C09K 8/58* (2013.01); *C09K 2208/32* (2013.01)

(58) Field of Classification Search
CPC .......... C01G 45/02; C09K 8/032; C09K 8/58; C09K 2208/32
See application file for complete search history.

(56) References Cited

U.S. PATENT DOCUMENTS

| | | | |
|---|---|---|---|
| 7,384,892 B2 | 6/2008 | Melbouci et al. | |
| 8,728,246 B2 * | 5/2014 | Varrin, Jr. | C02F 5/12 134/22.17 |
| 2013/0146289 A1 | 6/2013 | Moajil et al. | |
| 2014/0110121 A1 | 4/2014 | Al Moajil et al. | |
| 2014/0209392 A1 * | 7/2014 | Jamison | C04B 20/1025 175/217 |
| 2016/0376491 A1 * | 12/2016 | Al Moajil | E21B 37/00 166/300 |

FOREIGN PATENT DOCUMENTS

| | | | |
|---|---|---|---|
| CN | 106430318 A | * | 2/2017 |
| KR | 20210015207 A | | 2/2021 |
| WO | 2019045205 A1 | | 3/2019 |

OTHER PUBLICATIONS

Darley, H. et al., "Compositions and Properties of Drilling and Completion Fluids", 5th edition, 1988, p. 544-553.
Vogel, A., et al, "Macro and Semimicro Qualitative Inorganic Analysis", 4th ed., 1954, p. 287-288.
Wagle, V., et al. "Acid Soluble Drilling Fluids: Development and Field Trial", SPE-188883-MS, 2017 16 pages.
International Search Report for International Application No. PCT/US2023/012604, International Filing Date Feb. 8, 2023, dated Jul. 17, 2023, 4 pages.
Written Opinion for International Application No. PCT/US2023/012604, International Filing Date Feb. 8, 2023, dated Jul. 17, 2023, 6 pages.

* cited by examiner

*Primary Examiner* — Kumar R Bhushan
(74) *Attorney, Agent, or Firm* — CANTOR COLBURN LLP

(57) ABSTRACT

A method of increasing a solubility of a manganese oxide includes contacting the manganese oxide with an acid component in the presence of a dissolution accelerator that includes at least one of hydrazine, a hydrazine derivative, or a hydrazide. Also disclosed is a drilling fluid containing a carrier; $MnO_2$; and at least one of a viscosifier, a rheology modifier, a dispersant, a weighting agent, a defoamer, a fluid loss agent, bentonite, or a lubricant.

22 Claims, 1 Drawing Sheet

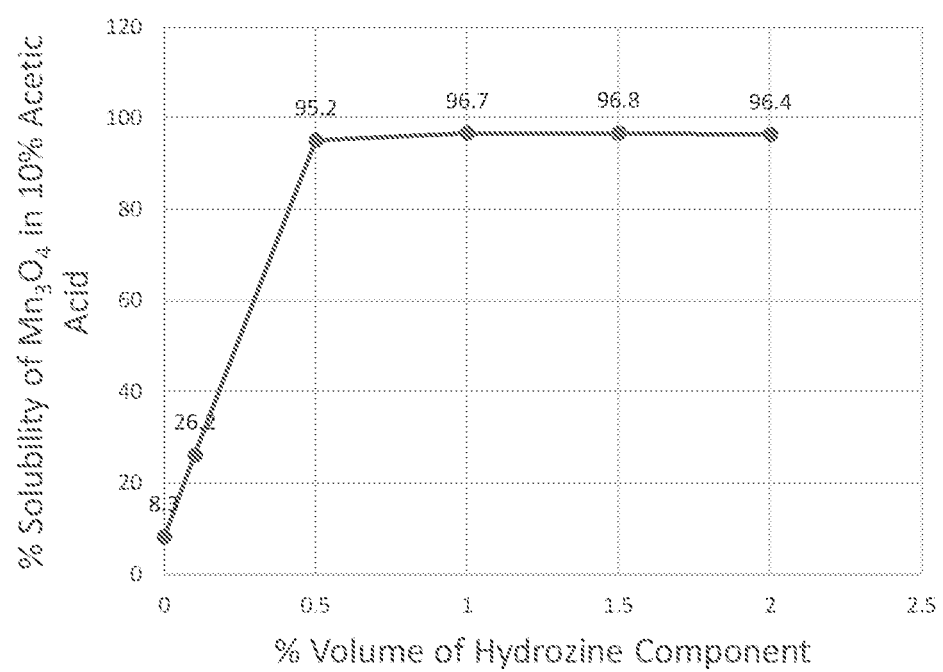

METHOD FOR MANGANESE OXIDES DISSOLUTION

BACKGROUND

This disclosure relates to the dissolution of manganese oxides, in particular, the dissolution of manganese oxides in acids or acid precursors for drilling, stimulation, completion, production, or remediation operations.

Drilling fluids are fluids that can aid the drilling of boreholes into a subterranean formation. Drilling fluids typically contain different solids to control fluid losses to the formation by forming a filter cake and to densify the fluids to control the formation pressure. After the drilling operation is completed and before a well is put on production, the filter cake and the drilling fluid residues, which contain the solids, need to be removed in order to improve the production rate and to avoid equipment failures.

According to Darley and Grey, Compositions and Properties of Drilling Fluids, 5$^{th}$ edition, 1988, p. 544-553, some common solids that can be used to increase a fluid's density include barite (barium sulfate), calcite (calcium carbonate), hematite, ilmenite, and siderite, among others. All these solids have specific gravities greater than 2.6 compared to 1 for water. However, only calcite can be easily dissolved in acids, and barite is essentially insoluble.

Recently manganese tetraoxide ($Mn_3O_4$) gained interest because of its high specific gravity of 4.8 or greater. A challenge with manganese tetroxide though is that filter cakes containing $Mn_3O_4$ are difficult to remove. In addition, dissolving $Mn_3O_4$ may generate undesirable byproducts. Accordingly, there is a continuing need for a method to effectively dissolve manganese oxides such as $Mn_3O_4$.

BRIEF DESCRIPTION

A method of increasing a solubility of a manganese oxide comprises: contacting the manganese oxide with an acid component in the presence of a dissolution accelerator, the dissolution accelerator comprising at least one of hydrazine, a hydrazine derivative, or a hydrazide.

A drilling fluid comprises a carrier; $MnO_2$; and at least one of a viscosifier, an emulsifier, sized particles, a filler, a rheology modifier, a dispersant, a weighting agent, a defoamer, a surfactant, a OH buffer, or a lubricant.

BRIEF DESCRIPTION OF THE DRAWINGS

The following descriptions should not be considered limiting in any way. With reference to the accompanying drawings, like elements are numbered alike:

The FIGURE is a graph of $Mn_3O_4$ solubility in 10% acetic acid versus the concentration of a dissolution accelerator in the acetic acid, illustrating the effect of the amount of the dissolution accelerator on the solubility of $Mn_3O_4$.

DETAILED DESCRIPTION

Manganese tetraoxide solids can partially dissolve in hydrochloric acid. However, the dissolution generates chlorine gas, which is not desirable. Limiting the concentration of the hydrochloric acid may mitigate the issue, but such limitation can result in poor filter cake removal. Weaker acids such as formic and acetic acid are less corrosive but they are less effective in dissolving $Mn_3O_4$, making them impractical to use in a commercial setting.

The inventors hereof have discovered that the solubility of a manganese oxide in acids can be greatly increased when a dissolution accelerator is used. In particular, less corrosive acids or acids that are otherwise not effective in dissolving manganese oxides without the dissolution accelerator can now be used to dissolve more manganese oxides optionally in a shorter period of time under the same conditions. In addition, using the dissolution accelerator can reduce the generation of undesirable reaction products. For example, without the dissolution accelerator, manganese tetraoxide partially dissolves in hydrogen chloride generating chlorine gas, and with the dissolution accelerator, the generation of the chlorine gas is minimized while at the same time the percent of the manganese tetraoxide that dissolves in hydrogen chloride is increased.

Moreover, because this is no known methods to effectively dissolve $MnO_2$, $MnO_2$ has not been used in drilling fluids. The discovery described herein provides an opportunity to use $MnO_2$ in drilling fluids since $MnO_2$ can now been effectively dissolved.

A method of increasing a solubility of a manganese oxide is described in detail hereinafter. The method comprises contacting a manganese oxide with an acid component in the presence of a dissolution accelerator.

As used herein, the manganese oxide includes at least one of $MnO$, $MnO_2$, $Mn_2O_3$, $Mn_3O_4$, $MnO_3$, or $Mn_2O_7$, preferably at least one of $MnO_2$, $Mn_2O_3$, or $Mn_3O_4$, more preferably at least one of $MnO_2$ or $Mn_3O_4$.

The acid component can comprise an acid, an acid precursor, or a combination thereof. The acid precursor includes, but is not limited to an ester. In an aspect, the acid component comprises at least one of an inorganic acid, an organic acid such as a carboxylic acid, or an ester. For example, the acid component can comprise at least one of $HCl$, $HBr$, $HF$, $H_2SO_4$, $HNO_3$, $H_3PO_4$, acetic acid, formic acid, lactic acid, citric acid, phthalic acid, propionic acid, an amino acid, or an ester. The ester can be an ester of acetic acid, an ester of formic acid, an ester of lactic acid, an ester of citric acid, an ester of phthalic acid, or an ester of an amino acid.

The acid component can comprise a corrosion inhibitor such as an organic, inorganic, anodic or cathodic acid inhibitor. The corrosion inhibitor serves to reduce or prevent the corrosion of metal or metal-containing equipment. Examples of the corrosion inhibitor include quaternary ammonium compounds, sulfur compounds, isopropanol, methanol, alcohols ethoxylated, thiourea, formaldehyde, 1-phenylethanone, thio-alcohols, acetylenic and propargyl alcohols, alkylpyridine benzyl chloride quaternary, oxyalkylated fatty alcohol, ethoxylated tall oil, acetophenone, aldehydes, or phosphates.

Optionally the acid component is an aqueous solution of an inorganic acid or carboxylic acid as described herein. The concentration of the acid in the aqueous solution can be about 1 weight percent (w %) to about 30 wt %, preferably about 2 wt % to about 20 wt %, or about 3 wt % to about 10 wt %, based on a total weight of the aqueous solution. The aqueous solution can comprise one acid or a combination of different acids.

The dissolution accelerator comprises a compound having two nitrogen atoms linked via a covalent bond. In an aspect, the dissolution accelerator can comprise at least one of hydrazine, a hydrazine derive, or a hydrazide. Examples of the hydrazine derivative include but are not limited to hydrazine hydrate, a hydrazine salt such as hydrazine hydrochloride; hydrazine hydrobromide; and hydrazine carbonate or an organohydrazine where one or two of the hydrogen atoms on hydrazine $H_2N-NH_2$ are substituted with an organic group such as a substituted or unsubstituted $C_{1-15}$, $C_{1-10}$, or $C_{1-6}$ alkyl or aryl group. Examples of the hydrazide include but are not limited to adipic acid dihydrazide and the like.

A molar ratio of the dissolution accelerator to the manganese oxide can be about 0.1:1 to about 10:1, preferably about 0.2:1 to 5:1, and more preferably about 0.5:1 to about 2:1. A molar ratio of the acid component to the manganese oxide can be about 1:1 to about 100:1, preferably about 1.5:1 to about 30:1, more preferably about 2:1 to about 15:1.

As discussed herein, dissolving the manganese oxide with an acid component in the presence of the dissolution accelerator can reduce the generation of undesirable products under certain circumstances. Without the dissolution accelerator, it is believed that a manganese oxide can react with hydrochloric acid via the following reactions:

$$MnO_2+4HCl \rightarrow MnCl_2+Cl_2+2H_2O \quad (1)$$

$$Mn_3O_4+8HCl \rightarrow 3MnCl_2+Cl_2+4H_2O \quad (2)$$

(Vogel, Arthur I., et al, Macro and Semimicro Qualitative Inorganic Analysis, 4$^{th}$ ed., 1954, p. 287-288).

Without wishing to be bound by theory, it is believed that if a manganese oxide is contacted with hydrochloric acid in the presence a dissolution accelerator as described therein, the following reactions may occur during the dissolution of the manganese oxide using $MnO_2$ as an example:

$$MnO_2+4HCl \rightarrow MnCl_2+Cl_2+2H_2O \quad (3)$$

$$2Cl_2+N_2H_4 \rightarrow 4HCl+N_2 \quad (4)$$

As shown in reactions (3) and (4), $MnO_2$ may still react with HCl producing $Cl_2$, but the produced $Cl_2$ is not released as undesirable chlorine gas. Rather, $Cl_2$ can react with hydrazine producing more HCl, and the in situ generated HCl can react with $MnO_2$, thus dissolving more $MnO_2$.

Further without wishing to be bound by theory, it is believed that another possibility is that the $Mn_3O_4$ and $MnO_2$ may be converted to MnO first then the MnO dissolves in the acid as shown below using acetic acid as an example.

$$2MnO_2+N_2H_4 \rightarrow 2MnO+N_2+2H_2O \quad (5)$$

$$MnO+2H_2C_2O_2H_2+Mn(HC_2O_2H_2)_2+H_2O \quad (6)$$

Regardless of the reaction mechanism, the method can produce a manganese salt of the acid used, and this manganese salt may be used for various chemical reactions and applications. Accordingly, the method can further comprise forming a treatment fluid comprising a product obtained by contacting the manganese oxide with the acid component in the presence of the dissolution accelerator. In addition to the dissolution product, the treatment fluid can optionally include known additives depending on the final application, and can be used in various drilling, stimulation, completion, production, or remediation operations.

As a specific example, since $MnCl_2$ is water soluble, a manganese oxide can dissolve in HCl in the presence of a dissolution accelerator, and the produced $MnCl_2$ can be mixed with sodium carbonate producing manganese carbonate, which can be further used in various chemical reactions.

The contacting of the manganese oxide with the acid component in the presence of the dissolution accelerator can be conducted at about 50° F. to about 400° F., preferably about 70° F. to about 350° F., more preferably about 100° F. to about 300° F. Optionally, the contacting is conducted in a downhole environment, for example during drilling, stimulation, completion, production, or remediation operations.

Optionally, the manganese oxide can be contacted with the acid component in the presence of a dissolution accelerator and other chemicals such as a brine comprising at least one of a halide or formate salt of calcium, sodium, potassium, cesium, or zinc.

In an aspect, the manganese oxide can be contacted with the acid component in the presence of a dissolution accelerator and a calcium salt including calcium chloride, calcium bromide, calcium carbonate, or a combination thereof. When the acid component used is hydrogen bromide, the method can produce a high density brine containing $MnBr_2$ and $CaBr_2$. The high density brine can be used in various drilling, stimulation, completion, production, or remediation operations.

In an aspect, the manganese oxide is used in a drilling or completion operation in a well then removed. For example, the manganese oxide can be used in a drilling fluid as a weighting agent. The manganese can be present in an amount of about 10 to about 600 pounds, preferably about 20 to about 500 pounds, more preferably about 50 pounds to about 400 pounds per barrel (42 gallons) of the drilling fluid. As used herein, a drilling fluid includes a drill-in fluid, as the drill-in fluid is a type of drilling fluid designated especially for drilling through the reservoir section of a wellbore. The drilling fluid can be a water or brine-based drilling fluid, an oil or synthetic oil-based drilling fluid, or an invert emulsion based drilling fluid, which has a polar fluid such as water or brine emulsified as the internal phase with a non-polar fluid (oil) as the continuous phase. Other know types of drilling fluids can also be used.

The drilling fluid can contain a variety of ingredients. Thickening agents like xanthan gum and other polysaccrides and emulsifiers can be included in the drilling fluid to aid in the suspension of drill cuttings. Sized particles that cover a particular range and distribution can be included in the drilling fluid to minimize the fluid loss with the formation of a filter cake. The drilling fluid can also include fillers such as starch and clays to fill the void spaces within the sized particles. Weighting materials, rheology modifiers, defoamers, lubricants, dispersants, surfactants, pH buffers, or combinations thereof may also be used.

The drilling fluid can have a density of about 8.5 lb/gal to about 20 lb/gal, preferably about 10 lb/gal to about 18 lb/gal, more preferably about 12 lb/gal to about 18 lb/gal.

After the drilling operation, a filter cake formed adjacent the subterranean formation, the drilling fluid residue left on the casing or downhole equipment such as a drilling pipe, or a combination thereof can be removed by contacting the filter cake and the drilling fluid residue, which contain the manganese oxide, with the acid component in the presence of the dissolution accelerator.

In an aspect, the acid component and the dissolution accelerator can be combined to form a treatment fluid to remove the filter cake and the drilling fluid residues. The concentration of the acid component in the treatment fluid can be about 1 w % to about 30 wt %, preferably about 2 wt % to about 20 wt %, or about 3 wt % to about 10 wt %, based on a total weight of the treatment fluid. The concentration of the dissolution accelerator can be about 0.01 to about 30 wt %, preferably about 0.1 wt % to about 10 wt %, more preferably about 0.25 wt % to about 5 wt % based on a total weight of the treatment fluid. The treatment fluid can further include water or a brine as a carrier for the acid component and the dissolution accelerator. In addition, the treatment fluid can optionally comprise at least one of a solvent, a wetting agent, or a surfactant to aid in the removal of the oil or synthetic based oil residues from the drilling fluid.

When a filter cake or drilling fluid residues are formed from a synthetic based mud, the oil in the filter cake or the drilling fluid residues can form a barrier preventing an acid from reaching the solids in the filter cake or the drilling fluid residues to dissolve them. Mutual solvents, which can also be wetting agents because they can lower the surface tension of water, are soluble in both water and oil and can be included in the treatment fluid allowing the oil in the filter cake and drilling fluid residues to be removed and the acid component and the dissolution accelerator to contact the solids to dissolve them. Examples of the mutual solvents are glycol ethers like ethylene glycol mono butyl ether, propylene glycol methyl ether, dipropylene glycol methyl ether, ethylene glycol hexyl ether and the like. Other examples are alcohols like methanol, ethanol, n-propanol, iso-propanol and butanol along with many different types of diols like ethylene glycol, propylene glycol, diethylene glycol, triethylene glycol, and polyols of various molecular weights. Combination of two or more of the mutual solvents can be used.

Surfactants can also be included since they reduce the surface tension between the water and oil allowing them to mix. Preferred surfactants are nonionic surfactants such as alcohol ethoxylates and nonylphenol ethoxylates and combinations thereof. Other types like cationic, anionic and amphoteric surfactants can also be used as long as they do not significantly adversely affect the stability, function or use of the treatment fluid.

Spacers before and after the solids dissolution may be incorporated during the displacement of the drilling fluid in preparation of cementing the casing or placing a completion brine in its place just prior to perforating the well.

After the well is perforated the well is sometimes fracked. In preparation of the frack, the work string typically needs to be cleaned with an cleaning fluid to prevent any solids that might be left from the drilling fluid from entering the formation. By including the acid component and the dissolution accelerator in a spacer fluid, the conventional cleaning process may be improved since the drilling fluid residues can be effectively removed with the spacer fluid.

The method of dissolving manganese oxide with an acid component in the presence of a dissolution accelerator is further illustrated in the examples. The examples are not intended to limit the scope of the present invention and they should not be so interpreted.

EXAMPLES

Two suppliers of $Mn_3O_4$ were used in the examples below. DENSMAX™ is supplied by Prince while MICROMAX™ is supplied by Elkem.

Example 1 and Comparative Example 1

To determine the effect of hydrazine hydrate on the solubility of $Mn_3O_4$ (DENSMAX™) in HCl, two solutions were prepared with a solution of Example 1 containing 1.5 ml of 55% hydrazine hydrate (specific gravity=1.019) within 100 ml of a 5% HCl solution, and a solution of Comparative Example 1 containing 100 ml of 5% HCl solution without hydrazine hydrate. To the solution of Comparative Example 1, 1.5064 grams of $Mn_3O_4$ was added, and to the solution of Example 1, 1.5100 grams of $Mn_3O_4$ was added. Both mixtures were allowed to remain quiescent for 3 days at 70° F. At 3 days both mixtures were filtered through a Whatman 42 filter paper and allowed to dry in a 200° F. convection oven for 24 hours. The solubility of the $Mn_3O_4$ in the 5% HCl (Comparative Example 1) was 56.8% while in the solution containing hydrazine hydrate (Example 1) was 99.8% soluble. The results indicate that hydrazine hydrate can significantly increase the solubility of $Mn_3O_4$ in HCl.

Example 2 and Comparative Example 2

To determine the effect of hydrazine hydrate on the solubility on $MnO_2$ in HCl, two solutions were prepared with a solution of Example 2 containing 1.5 ml of 55% hydrazine hydrate within 100 ml of a 5% HCl solution and a solution of Comparative Example 2 containing 100 ml of 5% HCl solution without hydrazine hydrate. To the 5% HCl solution (Comparative Example 2) 1.5027 grams of $MnO_2$ was added, and to the solution containing hydrazine hydrate (Example 2), 1.5131 grams of $MnO_2$ was added. Both mixtures were allowed to remain quiescent for 3 days. At 3 days both mixtures were filtered through a Whatman 42 filter paper and allowed to dry in a 200° F. convection oven for 24 hours at 70° F. The solubility of the $MnO_2$ in the 5% HCl (Comparative Example 2) was 12.0% while in the solution containing hydrazine hydrate (Example 2) was 91.2% soluble. The results indicate that hydrazine hydrate can significantly increase the solubility of $MnO_2$ in HCl.

Example 3 and Comparative Example 3

To determine the effect of hydrazine hydrate on the solubility of $Mn_3O_4$ (DENSMAX™) in 8% formic acid, two solutions were prepare with a solution of Example 3 containing 1.5 ml of 55% hydrazine hydrate within 100 ml of an 8% formic acid solution and a solution of Comparative Example 3 containing 100 ml of 8% formal acid without hydrazine hydrate. To the 8% formic solution (Comparative Example 3), 1.4970 grams of $Mn_3O_4$ was added, and to the other solution containing hydrazine hydrate (Example 3), 1.5113 grams of $Mn_3O_4$ was added. Both mixtures were allowed to remain quiescent for 24 hours at 70° F. At 24 hours both mixtures were filtered through a Whatman 42 filter paper and allowed to dry in a 200° F. convection oven for 24 hours. The solubility of the $Mn_3O_4$ in the 8% formic acid (Comparative Example 3) was 47.8% while in the solution containing hydrazine hydrate (Example 3) was 98.5% soluble. The results indicate that hydrazine hydrate can significantly increase the solubility of $Mn_3O_4$ in formic acid.

Example 4 and Comparative Example 4

To determine the effect of hydrazine hydrate on the solubility on $MnO_2$ in formic acid, two solutions were prepared with a solution of Example 4 containing 1.5 ml of 55% hydrazine hydrate within 100 ml of an 8% formic acid solution and a solution of Comparative Example 4 containing 100 ml of 8% formic acid without hydrazine hydrate. To the 8% formic solution (Comparative Example 4), 1.4972 grams of $MnO_2$ was added, and to the other solution containing hydrazine hydrate (Example 4), 1.5115 grams of $MnO_2$ was added. Both mixtures were allowed to remain quiescent for 24 hours at 70° F. At 24 hours both mixtures were filtered through a Whatman 42 filter paper and allowed to dry in a 200° F. convection oven for 24 hours. The solubility of the $MnO_2$ in the 8% formic acid (Comparative Example 4) was 14.1% while in the solution containing hydrazine hydrate (Example 4) was 89.4% soluble. The results indicate that hydrazine hydrate can significantly increase the solubility of $MnO_2$ in formic acid.

Example 5

To determine the effect of hydrazine hydrate on the solubility of $MnO_2$ in formic acid containing $CaCl_2$ to increase the solution's density, a solution was prepared containing 1.5 ml of 55% hydrazine hydrate within 100 ml of an 8% formic acid and 9.5 ppg $CaCl_2$. To the mixture, 1.5135 grams of $MnO_2$ was added, and the resultant was allowed to remain quiescent for 24 hours at 70° F., filtered through a Whatman 42 filter paper, and then allowed to dry in a 200° F. convection oven for 24 hours. The solubility of the $MnO_2$ in the solution was 88.0% while in the solution not containing $CaCl_2$ described in Example 4 was 89.4% soluble. The results indicate that hydrazine hydrate can increase the solubility of $MnO_2$ in formic acid containing $CaCl_2$ to increase the density of $CaCl_2$ brine.

Example 6 and Comparative Example 6

To 200 ml of a 5% HCl solution (Comparative Example 6), 5.14 g of $Mn_3O_4$ (MICROMAX™) was added while to another 200 ml of 5% HCl, 5.26 grams of adipic acid dihydrazide along with 5.26 grams of $Mn_3O_4$ (MICROMAX™) were added (Example 6). Both mixtures were allowed to remain quiescent for 16 hours at 70° F. Excessive bubbling was observed with the adipic acid dihydrazide (Example 6) while very little bubbling was observed without it (Comparative Example 6). Both mixtures were filtered through a Whatman 41 filter paper to collect the undissolved solids and dried. The solution containing the adipic acid dihydrazide (Example 6) dissolved 98% of the solids whereas only 63% dissolved in the 5% HCl that did not contain adipic acid dihydrazide (Comparative Example 6). The results indicate that adipic acid dihydrazide can significantly increase the solubility of $Mn_3O_4$ in hydrochloric acid.

Example 7

Various amounts of 55% hydrazine hydrate were included in 100 ml of 10% acetic acid at 0, 0.5, 1.0, 1.5 and 2.0% by volume, which is 0, 0.005565, 0.01113, 0.01670 moles, respectively. Then 1.5 grams of $Mn_3O_4$ (0.006555 moles) was added to each solution and remained quiescent for 24 hours at 70° F. The moles of hydrazine to $Mn_3O_4$ ranged from 0 to 3.4. At 24 hours the solution was filtered through a Whatman 42 filter paper and allowed to dry in a 200° F. convection oven for 24 hours. The solubility results are summarized in the FIGURE. The FIGURE shows that the solubility increases linearly with the addition of hydrazine hydrate up to 0.5% where above 95% solubility was obtained, and further increasing the amount of hydrazine to more than 1% by volume does not significantly increase the solubility of $Mn_3O_4$.

Example 8

A drilling fluid was prepared by combining 341 ml of 10.5 ppg NaBr, 1.75 grams xanthan gum (Xanplex D), 6.0 grams modified starch (Biolose), 24 grams $MnO_2$, and 6 grams sized calcium carbonate. The weighing agent is $MnO_2$, and it is mixed with sized calcium carbonate to minimize the fluid loss or filtration rate.

The rheological properties were measured using an OFI Model 900 rheometer to confirm that there is enough viscosity to suspend the solids. The readings shown in the table at a particular revolutions/minute (RPM) are the readings (Direct Reading, D.R.) from the instrument using a B1 bob. The dial readings can be easily converted to viscosity. The fluid was split in half and the same fluid loss test was performed on each half to establish a filter cake. Prior to the placement of the fluid, DI water was flowed through the disk at 5 psig and 20 seconds to establish a flow rate. To one filter cake, 100 ml of an inhibited 5% HCl was placed on top of the filter cake inside a hastelloy cell and to the other filter cake, 100 ml of an inhibited 5% HCl containing 1.5 ml of 55% hydrazine hydrate. CI-27 is the corrosion inhibitor added at 6 gallons/thousand gallons (gal/Mgal) that is typically pumped to reduce the casing and tubing or workstring from corroding. Both cells were at 180° F. for 4 hours under 25 psig with the bottom valve closed. At 4 hours the valve was opened until at least 10 ml of filtrate was obtained which was nearly instantly for the cell containing hydrazine hydrate but 10 minutes was required for the one without. The retained flow was repeated as explained and was measured to be 26% for the one without hydrazine hydrate and 91% for the on containing hydrazine hydrate. The result are summarized in the table below.

TABLE

| Fluid Properties (D.R.) | |
|---|---|
| 600/300 rpm | 88/63 |
| 200/100 rpm | 51/35 |
| 6/3 rpm | 8/6 |
| Gels 10 sec/10 min/30 min, lb/100 ft$^2$ | 6/8/9 |
| Plastic viscosity, cP | 25 |
| Yield point, lb/100 ft$^2$ | 38 |
| Measured Temp. ° F. | 120 |

| Fluid Loss 180° F. 20 um Ceramic Disk, 500 psig | | |
|---|---|---|
| Time | ml | ml |
| 1 min. | 8.25 | 8.5 |
| 5 min. | 10 | 10.5 |
| 7.5 min. | 11 | 11.5 |
| 30 min. | 15 | 15.5 |
| 1 hour | 18.5 | 18.5 |
| 4 hours | 29 | 27.5 |

| Breaker Test at 180° F. and 25 psig | | |
|---|---|---|
| Breaker, 100 ml | 5% HCl with 1.5% of 55% hydrazine hydrate + 6 gal/Mgal CI-27 | 5% HCl + 6 gal/Mgal CI-27 |
| Soak Time | 4 hours | 4 hours |
| Retained Flow | 91% | 26% |

Set forth below are various embodiments of the disclosure.

Aspect 1. A method of increasing a solubility of a manganese oxide, the method comprising: contacting the manganese oxide with an acid component in the presence of a dissolution accelerator, the dissolution accelerator comprising at least one of hydrazine, a hydrazine derivative, or a hydrazide.

Aspect 2. The method as in any prior aspect, wherein the manganese oxide comprises at least one of MnO, $MnO_2$, $Mn_2O_3$, $Mn_3O_4$, $MnO_3$, or $Mn_2O_7$.

Aspect 3. The method as in any prior aspect, wherein the acid component comprises at least one of an inorganic acid, an organic acid, or an ester.

Aspect 4. The method as in any prior aspect, wherein the acid component comprises at least one of HCl, HBr, HF, $H_2SO_4$, $HNO_3$, $H_3PO_4$, acetic acid, formic acid, lactic acid, citric acid, phthalic acid, propionic acid, or an amino acid.

Aspect 5. The method as in any prior aspect, wherein the acid component further comprises a corrosion inhibitor.

Aspect 6. The method as in any prior aspect, wherein the hydrazine derivative comprises at least one of a hydrazine hydrate, a hydrazine salt, or an organohydrazine.

Aspect 7. The method as in any prior aspect, wherein the dissolution accelerator comprises at least one of hydrazine, hydrazine hydrate, hydrazine hydrochloride, hydrazine hydrobromide, hydrazine carbonate, or adipic acid dihydrazide.

Aspect 8. The method as in any prior aspect, wherein a molar ratio of the dissolution accelerator to the manganese oxide is about 0.1:1 to about 10:1.

Aspect 9. The method as in any prior aspect, wherein a molar ratio of the acid component to the manganese oxide is about 1:1 to about 100:1.

Aspect 10. The method as in any prior aspect, wherein the contacting is conducted at about 50° F. to about 400° F.

Aspect 11. The method as in any prior aspect, wherein the contacting is conducted in the presence of a brine comprising at least one of a halide or formate salt of calcium, sodium, potassium, cesium, or zinc.

Aspect 12. The method as in any prior aspect, wherein the contacting is conducted in the presence of a calcium salt.

Aspect 13. The method as in any prior aspect, wherein the calcium salt comprises at least one of calcium chloride, calcium bromide, or calcium carbonate.

Aspect 14. The method as in any prior aspect, further comprising forming a treatment fluid comprising a product obtained by contacting the manganese oxide with the acid component in the presence of the dissolution accelerator.

Aspect 15. The method as in any prior aspect, further comprising introducing the treatment fluid into a wellbore.

Aspect 16. The method as in any prior aspect, wherein the contacting is conducted in a downhole environment.

Aspect 17. The method as in any prior aspect, wherein the manganese oxide is contacted with the acid component in the presence of the dissolution accelerator during a drilling, stimulation, completion, production, or remediation operation.

Aspect 18. The method as in any prior aspect, wherein contacting the manganese oxide with the acid component in the presence of the dissolution accelerator comprises contacting a filter cake with a treatment fluid, the filter cake comprising the manganese oxide and the treatment fluid comprising the acid component and the dissolution accelerator.

Aspect 19. The method as in any prior aspect, further comprising introducing into a wellbore a drilling fluid comprising the manganese oxide, and forming the filter cake adjacent to a subterranean formation.

Aspect 20. A drilling fluid comprising a carrier; $MnO_2$; and at least one of a viscosifier, an emulsifier, sized particles, a filler, a rheology modifier, a dispersant, a weighting agent, a defoamer, a surfactant, a pH buffer, or a lubricant.

Aspect 21. The drilling fluid as in any prior aspect, comprising about 10 to about 600 pounds of the $MnO_2$ per barrel of the drilling fluid.

Aspect 22. A method of drilling a wellbore in a subterranean formation, the method comprising: circulating the drilling fluid as in any prior aspect in the subterranean formation.

All ranges disclosed herein are inclusive of the endpoints, and the endpoints are independently combinable with each other. As used herein, "combination" is inclusive of blends, mixtures, alloys, reaction products, and the like. All references are incorporated herein by reference in their entirety.

The use of the terms "a" and "an" and "the" and similar referents in the context of describing the invention (especially in the context of the following claims are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method comprising: contacting a manganese oxide with an acid component in the presence of a dissolution accelerator, the dissolution accelerator comprising at least one of hydrazine, a hydrazine derivative, or a hydrazide, forming a treatment fluid comprising a product obtained by contacting the manganese oxide with the acid component in the presence of the dissolution accelerator; and introducing the treatment fluid into a wellbore.

2. The method of claim 1, wherein the contacting is conducted in the presence of a brine comprising at least one of a halide or formate salt of calcium, sodium, potassium, cesium, or zinc.

3. The method of claim 1, wherein the contacting is conducted in the presence of a calcium salt.

4. The method of claim 3, wherein the calcium salt comprises at least one of calcium chloride, calcium bromide, or calcium carbonate.

5. The method of claim 1, wherein the manganese oxide comprises at least one of MnO, $MnO_2$, $Mn_2O_3$, $Mn_3O_4$, $MnO_3$, or $Mn_2O_7$.

6. The method of claim 1, wherein the acid component comprises at least one of an inorganic acid, an organic acid, or an ester.

7. The method of claim 1, wherein the acid component comprises at least one of HCl, HBr, HF, $H_2SO_4$, $HNO_3$, $H_3PO_4$, acetic acid, formic acid, lactic acid, citric acid, phthalic acid, propionic acid, or an amino acid.

8. The method of claim 1, wherein the dissolution accelerator comprises at least one of hydrazine, hydrazine hydrate, hydrazine hydrochloride, hydrazine hydrobromide, hydrazine carbonate, or adipic acid dihydrazide.

9. The method of claim 1, wherein a molar ratio of the dissolution accelerator to the manganese oxide is about 0.1:1 to about 10:1.

10. The method of claim 1, wherein a molar ratio of the acid component to the manganese oxide is about 1:1 to about 100:1.

11. A method of increasing a solubility of a manganese oxide, the method comprising: contacting the manganese oxide with an acid component in the presence of a dissolution accelerator, the dissolution accelerator comprising at least one of hydrazine, a hydrazine derivative, or a hydrazide, wherein the manganese oxide is contacted with the acid component in the presence of the dissolution accelerator during a drilling, stimulation, completion, production, or remediation operation.

12. The method of claim 11, wherein the hydrazine derivative comprises at least one of a hydrazine hydrate, a hydrazine salt, or an organohydrazine.

13. The method of claim 11, wherein contacting the manganese oxide with the acid component in the presence of the dissolution accelerator comprises contacting a filter cake with a treatment fluid, the filter cake comprising the manganese oxide and the treatment fluid comprising the acid component and the dissolution accelerator.

14. The method of claim 13, further comprising introducing into a wellbore a drilling fluid comprising the manganese oxide, and forming the filter cake adjacent to a subterranean formation.

15. The method of claim 11, wherein the manganese oxide comprises at least one of $MnO$, $MnO_2$, $Mn_2O_3$, $Mn_3O_4$, $MnO_3$, or $Mn_2O_7$.

16. The method of claim 11, wherein the acid component comprises at least one of an inorganic acid, an organic acid, or an ester.

17. The method of claim 11, wherein the acid component comprises at least one of $HCl$, $HBr$, $HF$, $H_2SO_4$, $HNO_3$, $H_3PO_4$, acetic acid, formic acid, lactic acid, citric acid, phthalic acid, propionic acid, or an amino acid.

18. The method of claim 17, wherein the acid component further comprises a corrosion inhibitor.

19. The method of claim 11, wherein the dissolution accelerator comprises at least one of hydrazine, hydrazine hydrate, hydrazine hydrochloride, hydrazine hydrobromide, hydrazine carbonate, or adipic acid dihydrazide.

20. The method of claim 11, wherein a molar ratio of the dissolution accelerator to the manganese oxide is about 0.1:1 to about 10:1.

21. The method of claim 11, wherein a molar ratio of the acid component to the manganese oxide is about 1:1 to about 100:1.

22. The method of claim 11, wherein the contacting is conducted at about 50° F. to about 400° F.

* * * * *

UNITED STATES PATENT AND TRADEMARK OFFICE
CERTIFICATE OF CORRECTION

PATENT NO. : 11,919,782 B2
APPLICATION NO. : 17/678539
DATED : March 5, 2024
INVENTOR(S) : Daniel P. Vollmer and Dorianne A. Castillo It is certified that error appears in the above-identified patent and that said Letters Patent is hereby corrected as shown below:

In the Drawings

FIGURE 1, x axis, change "Hydrozine" to --Hydrazine--.

Signed and Sealed this
Twenty-third Day of April, 2024

Katherine Kelly Vidal
*Director of the United States Patent and Trademark Office*